United States Patent
Cabot et al.

(10) Patent No.: US 7,401,184 B2
(45) Date of Patent: Jul. 15, 2008

(54) MATCHING MEMORY TRANSACTIONS TO CACHE LINE BOUNDARIES

(75) Inventors: Mason B. Cabot, San Francisco, CA (US); Frank T. Hady, Portland, OR (US); Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 10/993,901

(22) Filed: Nov. 19, 2004

(65) Prior Publication Data

US 2006/0112235 A1   May 25, 2006

(51) Int. Cl.
 *G06F 12/00* (2006.01)
(52) U.S. Cl. .................. 711/118; 711/3; 711/125; 711/137
(58) Field of Classification Search .............. None
 See application file for complete search history.

(56) References Cited

U.S. PATENT DOCUMENTS

| | | | | |
|---|---|---|---|---|
| 5,966,734 | A  * | 10/1999 | Mohamed et al. | ........... 711/173 |
| 6,684,821 | B2 | 2/2004 | Lannes et al. | |
| 6,868,476 | B2 | 3/2005 | Rosenbluth et al. | |
| 2003/0105899 | A1 | 6/2003 | Rosenbluth et al. | |
| 2004/0024821 | A1 | 2/2004 | Hady | |
| 2005/0238035 | A1* | 10/2005 | Riley | .......................... 370/401 |
| 2007/0136495 | A1* | 6/2007 | Boucher et al. | ............. 709/250 |

* cited by examiner

*Primary Examiner*—Reginald G. Bragdon
*Assistant Examiner*—Mehdi Namazi
(74) *Attorney, Agent, or Firm*—Grossman, Tucker, Perreault & Pfleger, PLLC

(57) ABSTRACT

In general, in one aspect, the disclosure describes a method that includes generating multiple cache line accesses to multiple respective cache lines of a cache as required to satisfy an access to data specified by a single instruction of a processing element specifying an access to data.

34 Claims, 8 Drawing Sheets

MATCHING MEMORY TRANSACTIONS TO CACHE LINE BOUNDARIES

BACKGROUND

Network processors may generate memory accesses to data on byte-aligned addresses and with widely-variable, byte-granularity length. In contrast, general purpose processors often use memory systems with caches and thus generate memory accesses that are aligned to fall within single cache lines and are performance optimized for full cache line, aligned access.

DETAILED DESCRIPTION

Figure 1:
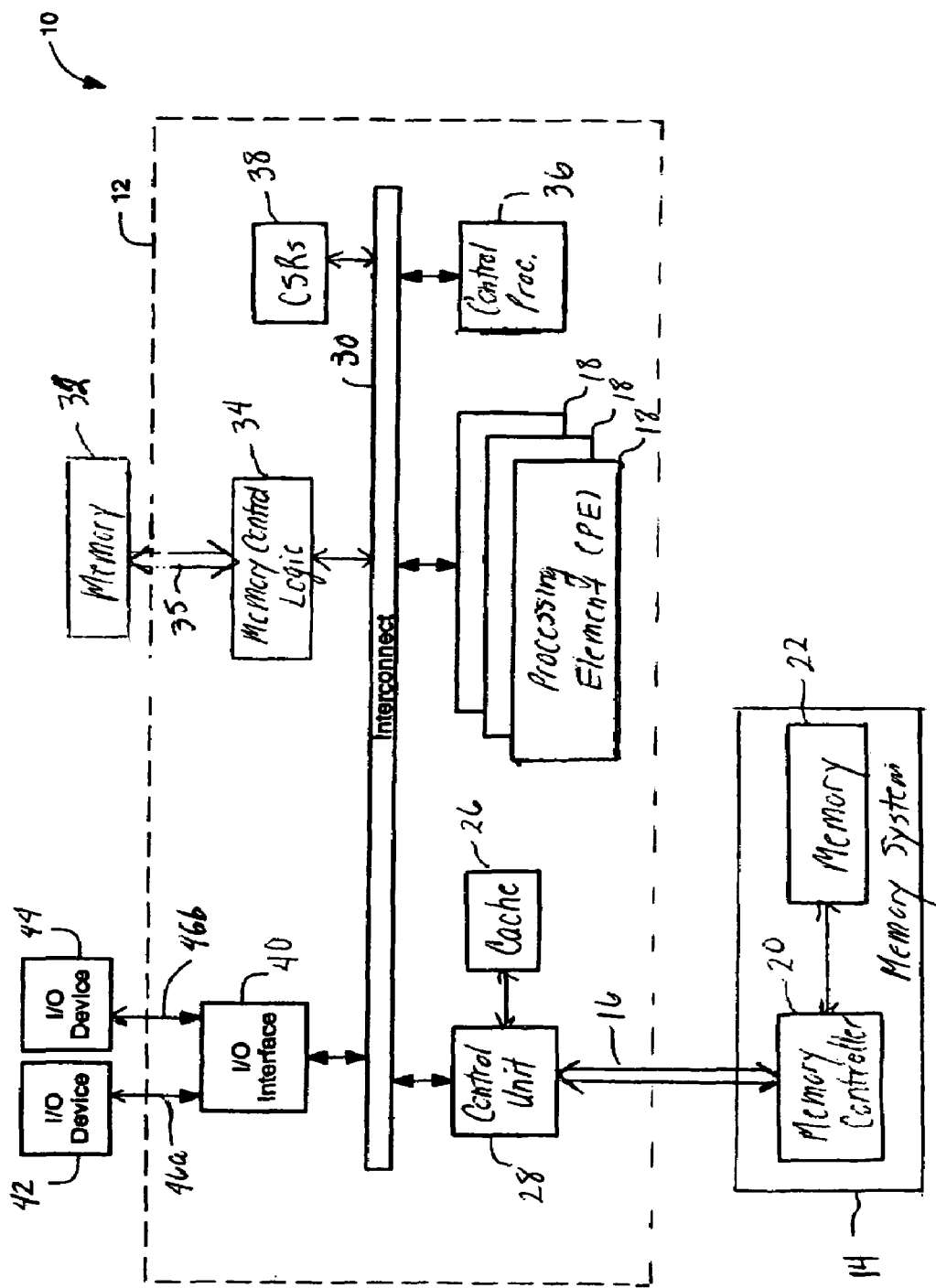
FIG. 1 is a block diagram of an exemplary system that includes a processor having a cache-based memory system.

FIG. 1 shows a system 10 in which a processor, such as a network processor ("NP") 12, is coupled to an external memory system 14 by a memory bus 16. The NP 12 includes one or more processing elements 18 (e.g., programmable cores) that can initiate memory access transactions directed to the memory system 14. The memory system 14 includes a memory controller 20, which connects to a memory 22. The memory controller 20 controls accesses to the memory 22 by the NP 12.

The memory system 14 is part of a cache-based memory system that includes a cache 26. The cache 26 is shown as an integral component of the NP 12. The cache 26 is organized into blocks, also known as "cache lines", of a given fixed size (e.g., 'x' bytes). The cache 26 includes logic mapping different cache lines to different memory address ("tags"). The cache 26 can search this map to determine whether requested data is currently cached ("a hit") or not ("a miss"). Cache logic can also include logic to fetch and store requested lines from main memory and to write back modified lines to memory to make room for new lines.

The NP 12 further includes a control unit 28 to manage accesses to the cache 26 and the memory 22 (via the memory bus 16 and memory controller 20). The control unit 28 is connected to the memory bus 16, the cache 26 and an internal NP interconnect 30. The PEs 18 are also coupled to the interconnect 30. A PE 18 can initiate a memory transaction in response to a single memory access instruction encountered during processing of program instructions by the processing element. The PE 18 can respond to the instruction by sending a memory access command to the control unit 28 over the interconnect 30. The memory access command and/or processing element instruction may specify the command type, e.g., whether the command is a read or write, an address and length of the transaction. The length of the transaction is the amount of data to be accessed (e.g., read or written), beginning at the specified address.

The NP 12 is designed with a high degree of flexibility in the way it can access the memory 22. In particular, the processing elements 18 can initiate memory transactions to access data on byte-aligned addresses and with variable, byte-granularity length. The control unit 28 may receive, for a given PE memory command, an address/length pair that crosses one or more cache line boundaries, thus affecting more than one cache line. Consequently, because cacheable memory must be accessed by cache line, the control unit 28 is configured to generate, for each PE originating memory access that affects more than one cache line, a correct number of cache-based transactions that are aligned to fall within single cache lines (that is, cache line accesses). Moreover, a resulting transfer between the memory 22 and the cache 26 (over the memory bus 16) is also aligned to a single cache line.

The system 10 and the NP 12 may include other components as well. For example, and as shown in the figure, the system 10 may include in its memory hierarchy a second memory system that is not cache-based. For example, the system 10 may include a memory 32 controlled and connected to the interconnect 30 by NP internal memory control logic 34. The memory 32 may include Dynamic Random Access Memory (DRAM) and/or Static Random Access Memory (SRAM). The DRAM may be used to store large volumes of data during packet processing, e.g., payloads from network packets, whereas the SRAM may be used for low latency, fast access tasks, e.g., accessing look-up tables, storing buffer descriptors and free buffer lists, and so forth. Memory busses 35 couple the memory control logic 34 to the external memory 32. In the embodiment illustrated in FIG. 1, the cache-based memory system could be used in lieu of all of or a portion of the non-cache-based memory system or, alternatively, to supplement the non-cache-based memory system if greater memory capacity is needed. Although not shown, the memory controller 20 could be connected to other special purpose devices that operate on data stored in the memory 32 as well.

The NP 12 may include other processing devices, such as a control processor 36 (as shown in the figure) or a co-processor. The control processor 36 may be programmed, for example, to handle protocols and exception packets, as well as provide support for higher layer network processing tasks.

Other resources of the NP 12 may include control status registers (CSRs) 38 and an I/O interface 40. The I/O interface 40 is responsible for controlling and interfacing the NP 12 to one or more I/O devices, shown as I/O devices 42, 44. The I/O Interface 40 is coupled to the I/O devices 42 and 44 via separate bus lines 46a and 46b, respectively.

The I/O devices 42 and 44 can be any network devices capable of transmitting and/or receiving network traffic data, such as framing/media access control (MAC) devices, e.g., for connecting to 10/100BaseT Ethernet, Gigabit Ethernet, Asynchronous Transfer Mode (ATM) or other types of networks, or devices for connecting to a switch fabric. For example, in one arrangement, the I/O device 42 could be an Ethernet MAC device (connected to an Ethernet network, not shown) that transmits data to the NP 12 and I/O device 44 could be a switch fabric interface that receives processed data from the NP 12 for transmission onto a switch fabric. In such an implementation, that is, when handling traffic to be sent to a switch fabric, the NP 12 would be acting as an ingress network processor. Alternatively, the NP 12 could operate as an egress network processor, handling traffic that is received from a switch fabric (via I/O device 44) and destined for another network device such as I/O device 42, or network coupled to such a device. Although the NP 12 can operate in a standalone mode, supporting both traffic directions, it will be understood that, to achieve higher performance, it may be desirable to use two dedicated NPs, one as an ingress processor and the other as an egress processor. The two dedicated processors would each be coupled to devices 14 and 16.

Other devices, such as a host computer, which may be coupled to an external bus controlled by an internal bus interface (not shown) can also serviced by the NP 12.

The processor 12 may be a multi-threaded multiprocessor, e.g., one based on the Intel® Internet Exchange Architecture (IXA), that includes internal PEs in the form of programming "microengines" (MEs) to be used for data plane processing, as well as a separate control processor (e.g., an XScale® or Intel® Architecture (IA) processor core) for control plane processing as well as some data plane processing. The MEs shown each feature hardware support for multi-threading (e.g., multiple program counter registers for the different threads). The processor integrates multiple MEs, the control processor, and other components on a single silicon die.

The ME is an example of a PE that can perform memory accesses without cache line alignment. In one embodiment, an ME can issue a request for anywhere from 4 to 64 bytes with Dword (8 bytes) or byte address alignment. Assuming a cache line size of 64 bytes a single 64-byte memory transaction may fall within one or two cache lines. The ME can perform two types of read and write accesses—with alignment and without alignment. For a read or write with alignment, the low two bits of the address specify the alignment—0, 1, 2, or 3 bytes. For a read or write without alignment, the low two bits of the address are ignored, effectively treating the address as Dword aligned.

Figure 2:
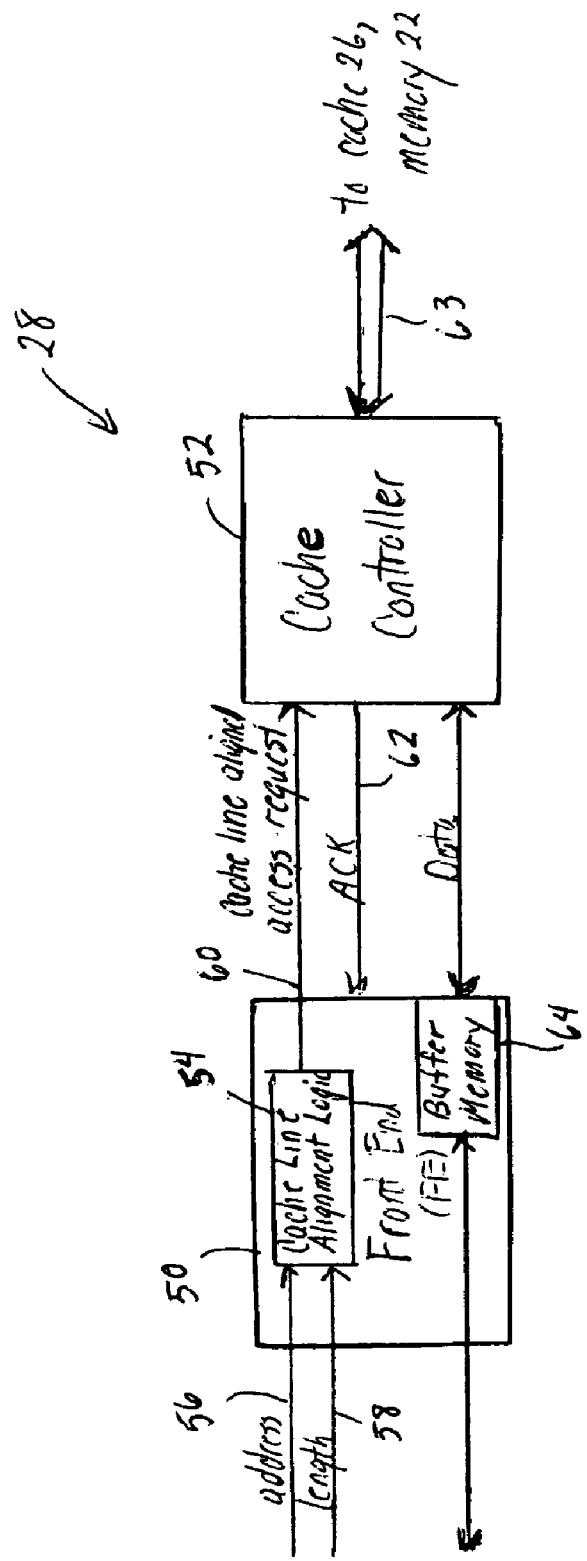
FIG. 2 is a block diagram of an exemplary controller that controls accesses to the cache-based memory system.

FIG. 2 shows an exemplary embodiment of the control unit 28. The control unit 28 includes a front end unit (FE) 50 and a cache controller 52. The cache controller 52 is connected to the cache 26, the memory bus 16 and the FE 40. The FE 50 is also connected to the interconnect 30. The FE 50 includes cache line logic 54 to translate a single PE requested memory transaction that may span one or more cache lines into the appropriate number of cache line accesses. That is, the logic 54 can generate multiple cache line accesses to retire a single instruction encountered by the PE during program processing (e.g., execution) specifying a memory access that crosses one or more cache line boundaries. For example, for a single ME instruction that encodes a read or modify of data held in more than one cache line and a single corresponding memory command, the logic 54 will generate multiple cache line accesses as required to satisfy the read or modify.

The logic 54 may be implemented in hardware, software or a combination of hardware and software. The FE 50 receives (or obtains) an address 56 and length 58 specified in an instruction provided by a PE via the interconnect 30. From this information the logic 54 determines which individual cache lines are affected by the memory transaction. The logic 54 generates requests 60, one per cache line, to the cache controller to find each of the cache lines. The cache controller 52, upon receiving a cache line access request, acknowledges the request via an acknowledge signal (ACK) 62 and generates the requested cache line access over buses 63. The cache controller 52 checks the cache 26 to determine if the cache 26 contains the requested cache line. In the case of a cache line miss, the cache controller 52 initiates a memory bus transaction to access the memory 22. Read data, whether it is returned by the cache 26 or the memory 22, may be stored in a buffer memory 64 in the FE 50 until the entire memory transaction is completed. Write data may be similarly buffered in the buffer memory 64.

If the PE 18 initiates a memory transaction for a memory access that is within a cache line (as determined from the address and length), only a single cache line request is needed. If, however, the memory access crosses a cache line boundary, the single memory transaction as requested by the PE is broken up into several transactions. A transaction is initiated for each cache line that is affected, and the original memory transaction will not be able to complete until all of the cache-based transactions have been completed.

Figure 3:
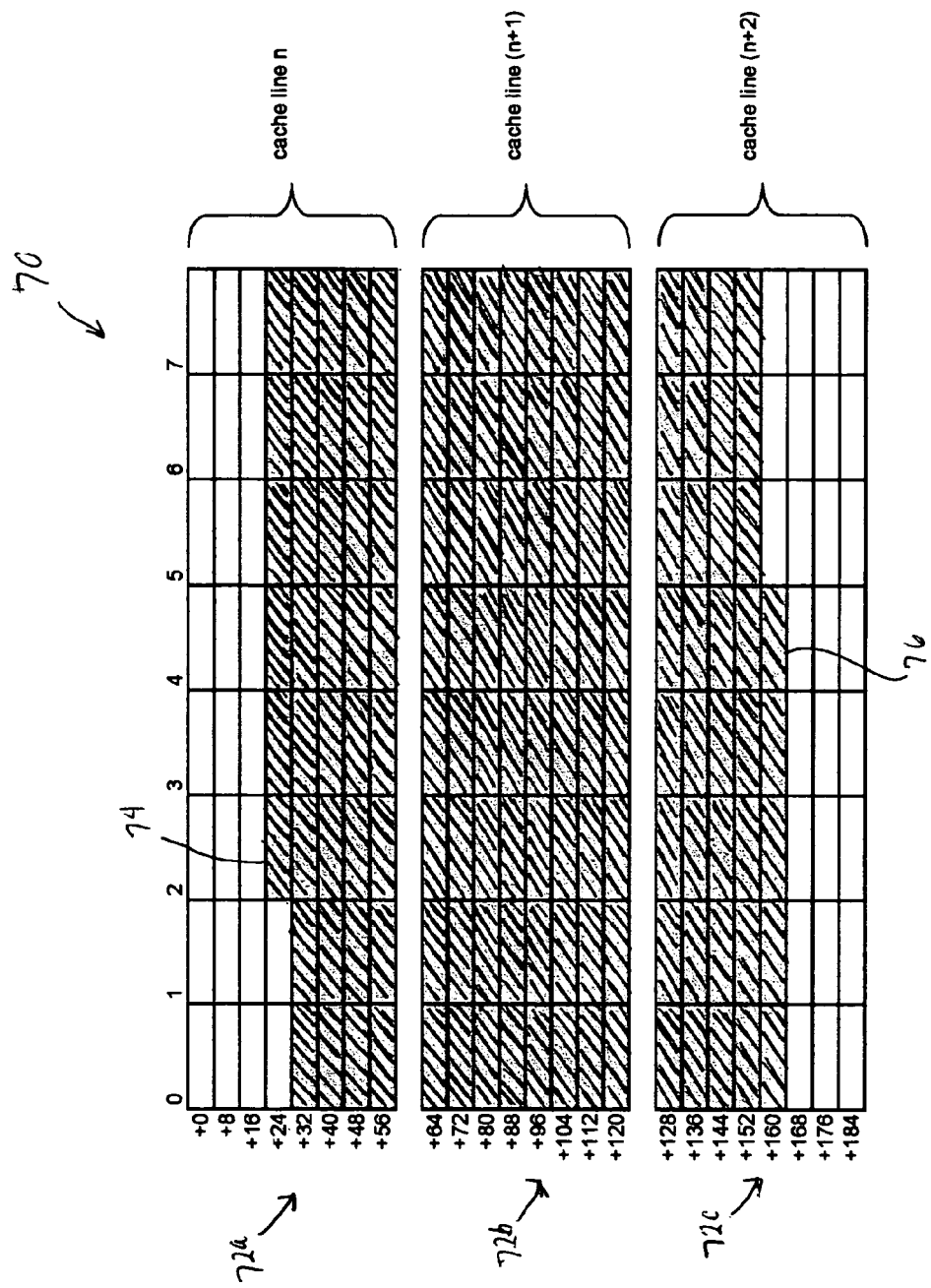
FIG. 3 is a depiction of a memory transaction that crosses cache line boundaries.

FIG. 3 shows a set of cache lines 70, including adjacent cache lines 'cache line n' 72a, 'cache line n+1' 72b and 'cache line n+2' 72c, and a mapping of an example PE initiated memory transaction (without cache line alignment) into that set of cache lines 70. In this particular example, the cache line size is 64 bytes. The memory transaction is directed to an address with an offset of 26 bytes and a length of 139 bytes. Thus, a memory access of 139 bytes starting at address 0x0000001A (byte 26), indicated by reference numeral 74, and ending at address 0x000000A5 (byte 165), indicated by reference numeral 76, will be filled from all three cache lines (cache line n 72a, cache line n+1 72b and cache line n+2 72c). The shaded bytes are those that are requested by the PE transaction.

Assuming a zero-based cache line addressing scheme, the following equations define how to generate cache-based (or cache line aligned) transactions from a PE memory transaction of arbitrary (byte-aligned) length and offset:

$$\text{start address} = \text{offset AND NOT (line size} - 1) \quad \text{Eq. 1}$$

$$\text{end address} = (\text{offset} + \text{length}) \text{ AND NOT (line size} - 1) \quad \text{Eq. 2}$$

$$\text{count} = 1 + (\text{end address} - \text{start address})/\text{line size} \quad \text{Eq. 3}$$

The PE-originated variables in these equations are defined as follows: "offset" is the first address of the PE-initiated memory transaction (byte-aligned); and "length" is the number of bytes addressed. The following definitions apply to the cache-based transactions: "line size" is the size of a cache line in bytes; "start address" is the address of the first cache line needed to begin the memory transaction, that is, the address of the first cache line access; "end address" is the address of the last cache line needed to complete the memory transaction, that is, the address of the last cache line access; and "count" is the number of cache lines (and thus cache line accesses) needed to complete the entire memory transaction.

The start address is determined by masking off the low order (line size−1) bits of the offset address. The end address is determined similarly by masking off the low order (line size−1) bits of the last address (offset+length). The count of transactions is '1' plus the difference between the start address and the end address divided by the line size.

Still referring to FIG. 3, the single memory transaction initiated by a PE maps into three adjacent cache lines, all three of which must be accessed in order to complete the originating memory transaction. From the single initiating memory transaction (a read from the PE of 139 bytes of data starting at offset 26 bytes) the logic 54 generates three cache-based transactions to access the cache lines at offsets 0, 64, and 128 bytes. Each cache line aligned block either hits or misses the cache. If a cache line miss is detected, a memory access is initiated on the memory bus for the entire cache line.

The computations for the example memory transaction shown in FIG. 3 (using Eqs. 1-3 above) are as follows. In this example, as mentioned above, the line size is 64. First consider Eq. 1. The value of (line size−1) is 63 and the offset is 26. The values of 63 and 26 in hexadecimal are 0x0000003F and 0x0000003F1A, respectively. The inverted value of 0x0000003F is 0xFFFFFFC0. Performing the logical operation AND on 0x000000A1 and 0xFFFFFFC0 gives a result of '0'. Thus, based on the result of Eq. 1, the start address is determined to be byte 0. Now consider Eq. 2 in determining the end address. The inverted value of (line size−1) is the same as before, 0xFFFFFFC0. The value of (offset+length), where offset is equal to 26 and length is equal to 139, is 165. The hexadecimal value of 165 is 0x000000A5. The ANDing of 0xFFFFFFC0 and 0x000000A5 is 0x00000080. Thus, the end address is determined to be byte 128 (the decimal equivalent of 0x00000080). The count (number of cache lines) can be obtained from Eq. 3. The count is equal to 1 plus the difference between the start and end addresses divided by the line size, that is, 1+[(128−0)/64]=3. Thus, the number of cache lines is 3. Once the start address and count are known, the logic 54 can determine, in the case of a count greater than 1, the beginning address of any additional cache lines needed to complete the memory transaction.

Figure 4A:
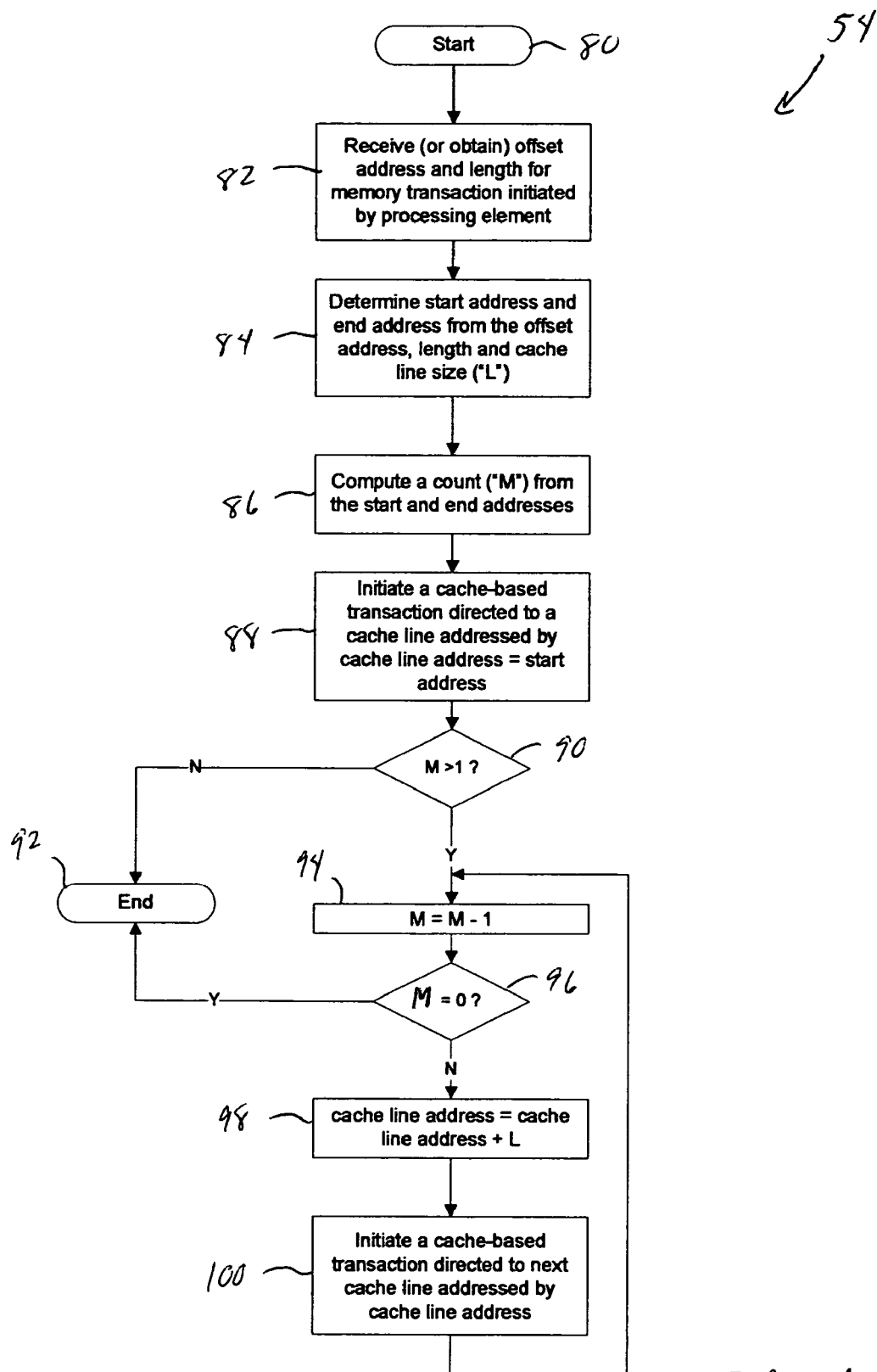
FIGS. 4A-4C are flow diagrams illustrating exemplary operations of the controller to generate cache line aligned memory transactions for a single memory transaction.

FIG. 4A illustrates an overview of the operations of the logic 54 in translating a transaction corresponding to a single processor instruction into the correct number of cache line aligned transactions. The logic 54 begins 80 by receiving 82 (or obtaining) an address/offset and length, in number of bytes, from a PE instruction initiating a memory access. The logic 54 determines 84 a start address and an end address from the offset, length and cache line size (L). The logic 54 computes 86 a count M from the start and end addresses. Once the logic 54 has computed M, the logic 54 initiates 'M' (where M is one or more) cache-based transactions. The logic 54 initiates 88 a first cache-based transaction at a cache line address equal to the start address. The logic determines 90 if the count M is greater than one. If it is determined that M is not greater than one, the logic 54 terminates 92 its operations, as only one cache-based transaction was required to complete the original transaction. If it is determined that M is greater than one, the logic 54 enters a loop to initiate the additional M−1 cache-based transaction(s). In one embodiment, the loop uses a downward counting counter to counter from M to zero. To begin the loop, the logic 54 decrements 94 the count M by one (M=M−1). The logic 54 determines 96 if M is equal to zero. If so, the operations are terminated at 92. If it is determined that M is not equal to zero, the logic 54 increases 98 the cache line address by L. The logic 54 initiates 100 a cache-based transaction at the cache line addressed by the updated cache line address. The logic 54 returns to 94 to decrement the count. The logic 54 loops in this fashion until all M cache-based transactions have been initiated, at which point the logic terminates at 94.

Figure 4B:
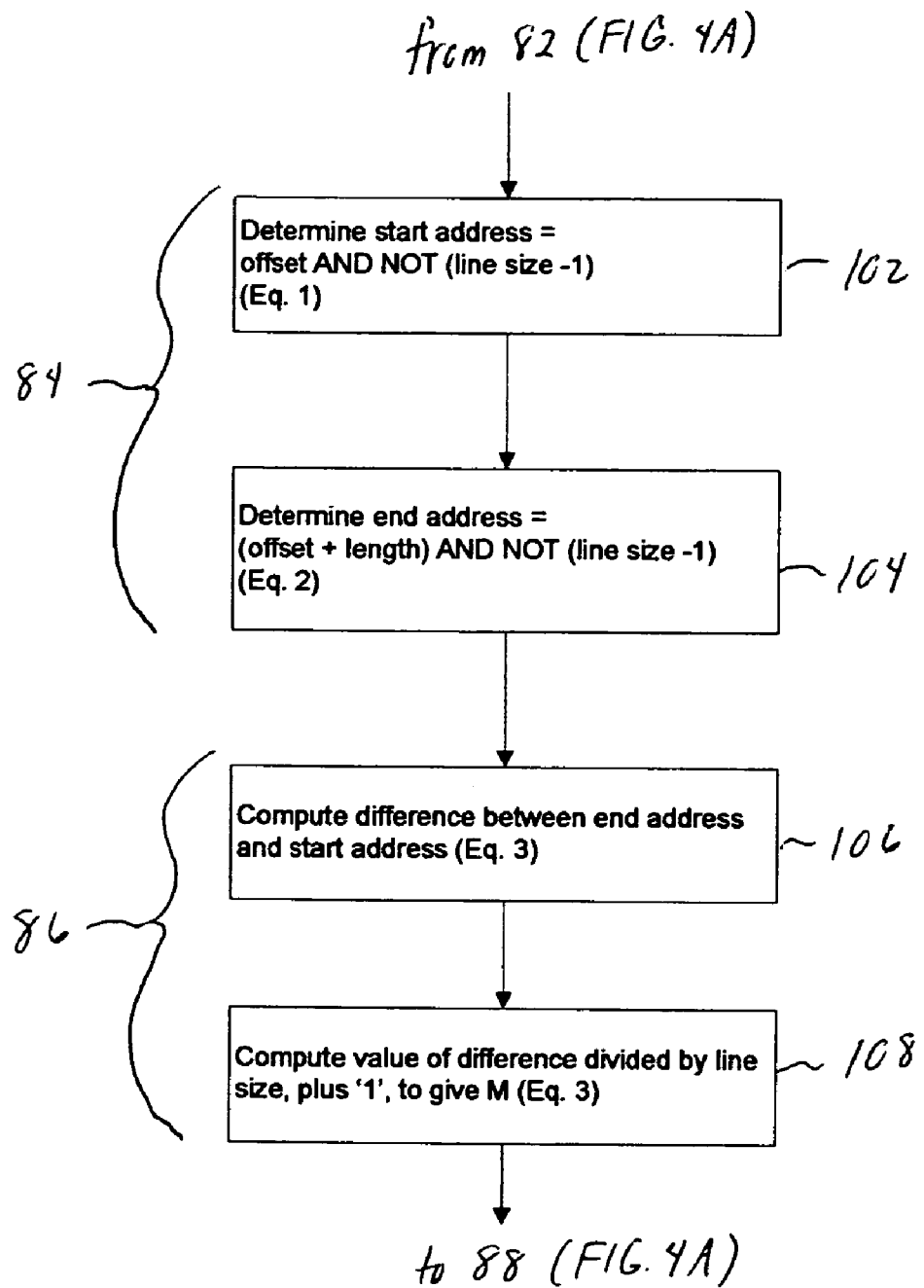

FIG. 4B provides details of an exemplary implementation of the processing at blocks 84 and 86 according to Eqs. 1-3 above. In the embodiment illustrated in FIG. 4B, the FE logic 54 performs the determination 84 according to Eqs. 1-2. First, the logic 54 determines 102 the start address by inverting the value of L−1 (that is, performing the logical operation NOT (L−1)) and performing a logical operation AND of the values offset and NOT (L−1), according to Eq. 1. The logic 54 then determines 104 the end address by ANDing (offset+length) with NOT (L−1), according to Eq. 2. The logic 54 performs the computation 86 according to Eq. 3, in the illustrated embodiment of FIG. 4B. The logic 54 computes 106 the difference between the end address and the start address. The logic 54 then computes M 108 from the difference by adding one to the difference divided by L. The exemplary implementation of FIG. 4B assumes that L is some power of 2, like 64, as in the example described earlier with reference to FIG. 3.

Figure 4C:
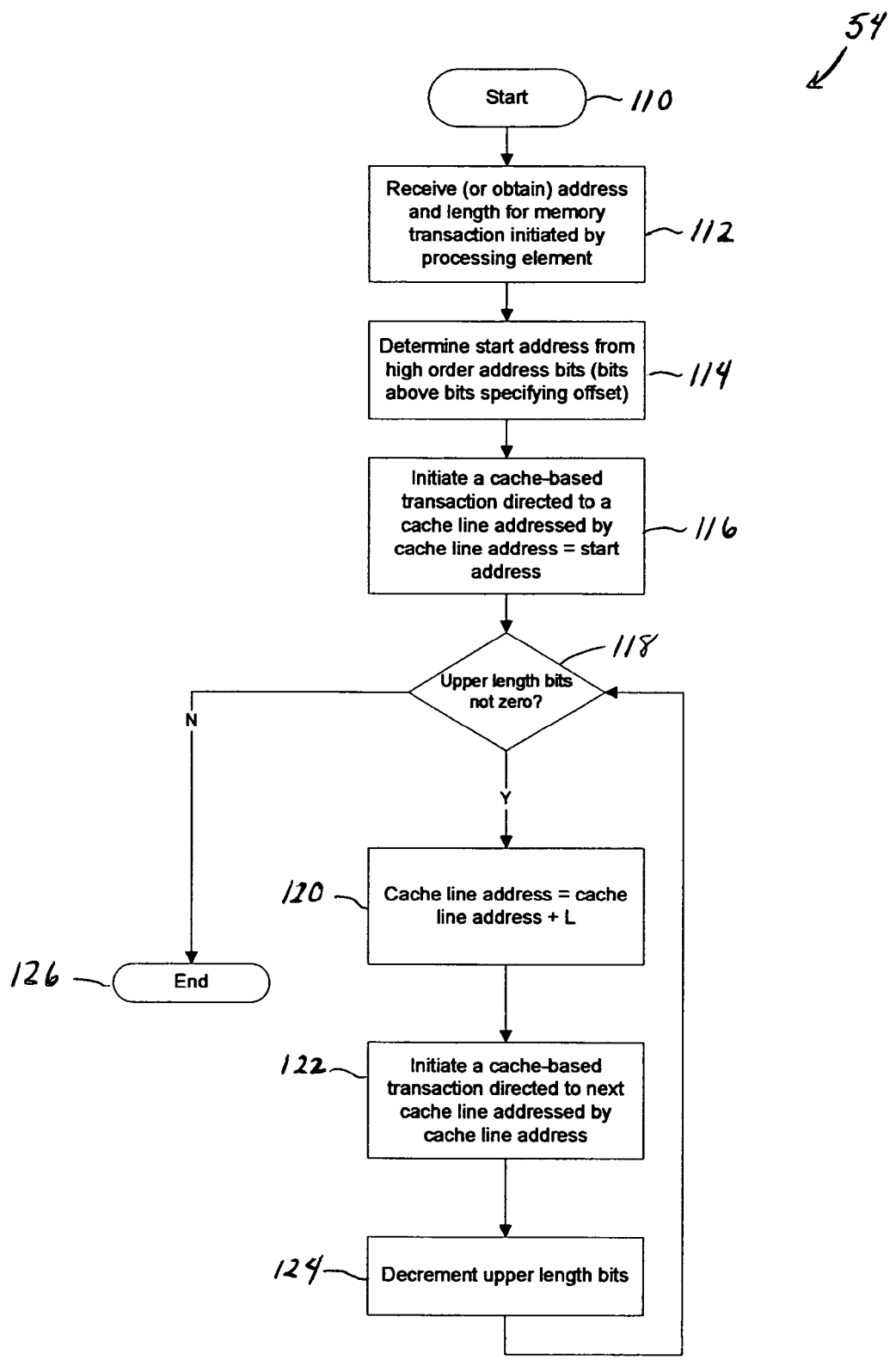

In an alternative embodiment, an example of which is illustrated in FIG. 4C, the logic 54 uses high order address bits (bit above those specifying the offset within a cache line) as the start address instead of determining the start address as described above. Turning to FIG. 4C, the logic 54 begins 110 by receiving (or obtaining) 112 the address and length for a memory transaction. The logic 54 determines 114 a start address from the high orders of the address (those bits specifying the cache line index or address). The logic 54 initiates 116 a cache-based transaction to a cache line address equal to the start address. To initiate cache-based transactions for more than one cache line, the logic 54, the logic 54 uses the same high order bits of the length ("upper length bits"), and while those upper length bits are not zero (as detected at 118), the logic 54 performs the following: increments 120 the cache line address by L, initiates 122 a cache-based transaction directed to a next cache line addressed by the cache line address and decrements 124 the upper length bits. When the upper length bits are zero (indicating that all cache line access required to satisfy the memory transaction have been initiated), the logic 54 terminates 126 its operation.

The examples illustrated above assumed some of the adjacent cache lines stored contiguous blocks of memory data. However, this condition may not always hold. Thus, the logic to generate multiple cache line transactions may generate transactions to non-adjacent cache lines based on the location of memory data.

The mechanism of the logic 54 allows NPs to connect to a memory system through a cache. Such a connection serves to reduce both the latency and the throughput required of that memory system.

Additionally, this mechanism may allow NPs to connect to the same memory system as a general purpose processor (GPP) and to access that memory system in a manner that is efficient and consistent with the way a GPP accesses the memory system, but without restricting the flexible addressing of the NP. Such a connection would enable the NP and the GPP to collaborate on specific networking algorithms (like Intrusion Detection, Firewalling, Secure Sockets Layer (SSL) acceleration, for example) in a more fine-grained manner. Such a shared memory configuration is shown in FIG. 5.

Figure 5:
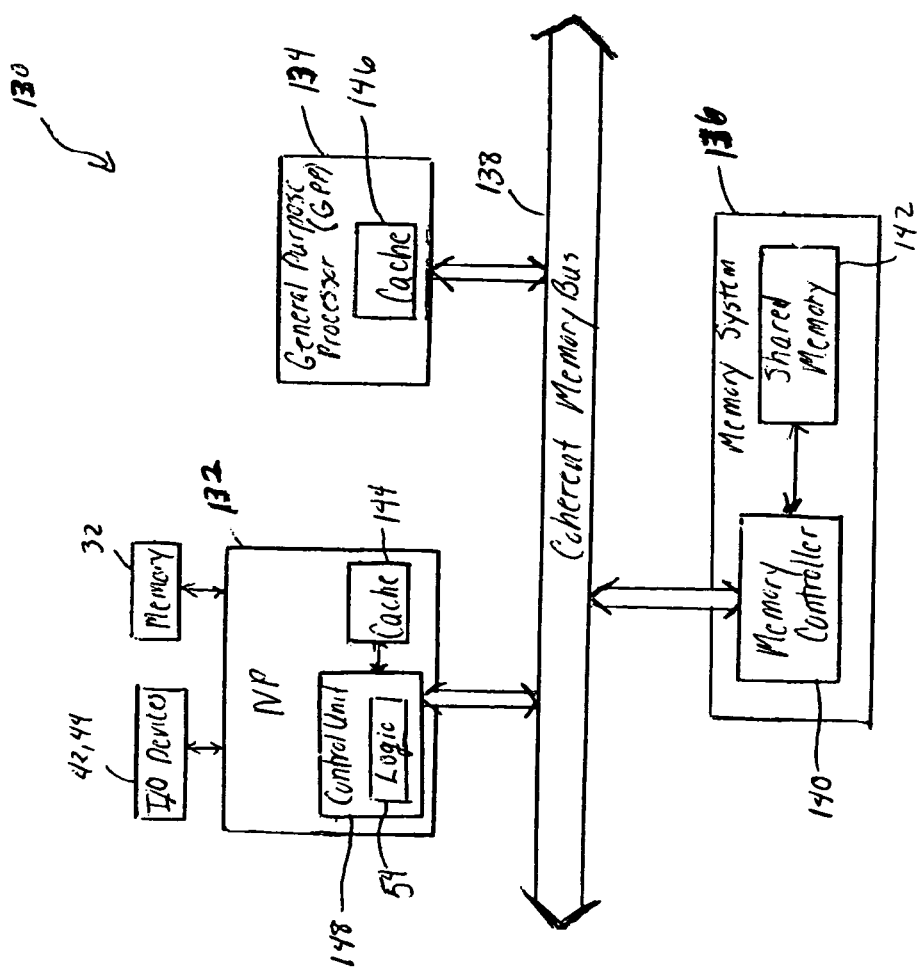
FIG. 5 is a block diagram of an exemplary system that includes a network processor and a general purpose processor configured in a shared memory architecture.

Referring to FIG. 5, a system 130 includes a NP 132 and a GPP 134 that are connected to memory system 136 via a coherent memory bus 138. The system 130 shown, thus, includes processors having different architectures (e.g., a different number and/or types of cores). The processors 132, 134 may be integrated in the same or different dies.

As shown, the memory system 136 includes a memory controller 140 and a "shared memory" 142, that is, a memory shared by the NP and GPP. The GPP 134 and the processing elements of the NP 132 can initiate transactions on the coherent memory bus 138.

The NP 132 and the GPP 134 each include a local cache. The cache of NP is shown as cache 144. The cache of the GPP 134 is shown as cache 146. The NP 132 also includes a control unit 148, which handles access to the cache 144 and the memory system 136, and also ensures that coherency is maintained between the cache 144 and the shared memory 142 as well as between the cache 144 and the cache 146 in the GPP 134. A single memory access by a processing element of the NP 132 can change data in cache 146 (e.g., a write to data in cache 144 can cause a coherency update of the data in cache 146).

Other operational units and external devices may be the same as those shown in FIG. 1. For example, the NP 132, like NP 12, may be coupled to external I/O devices 42, 44 and memory 32, as shown. In the illustrated embodiment of FIG. 5, the memory 32 could be used in the manner discussed earlier (with reference to FIG. 1), and the cacheable shared memory 142 could be used to pass information between the NP 132 and the GPP 134. For example, payload data stored in DRAM in the memory 32 could be transferred to the shared memory 142 for additional processing by the GPP 134. Other types of information to be exchanged between the NP and GPP, e.g., messages, pointers, protocol state (such as TCP state) and so forth, may be stored in the shared memory 142 and cached in the respective caches of the NP and GPP.

Internal processing elements of the NP 132 (not shown in FIG. 5), like those of the NP 12, can generate memory transactions with arbitrary length and offset. To support such flexibility in a more restrictive cache-based memory environment, the control unit 148 includes logic like logic 54, described earlier.

Memory bus requests from the GPP 134 fall within a single cache line. The GPP 134 may be any processor that has a CPU core and integrated cache, e.g., an Intel® Architecture processor ("IA processor") such as the Intel® Xeon™ processor, or some other CPU based, general purpose computing architecture.

Figure 6:
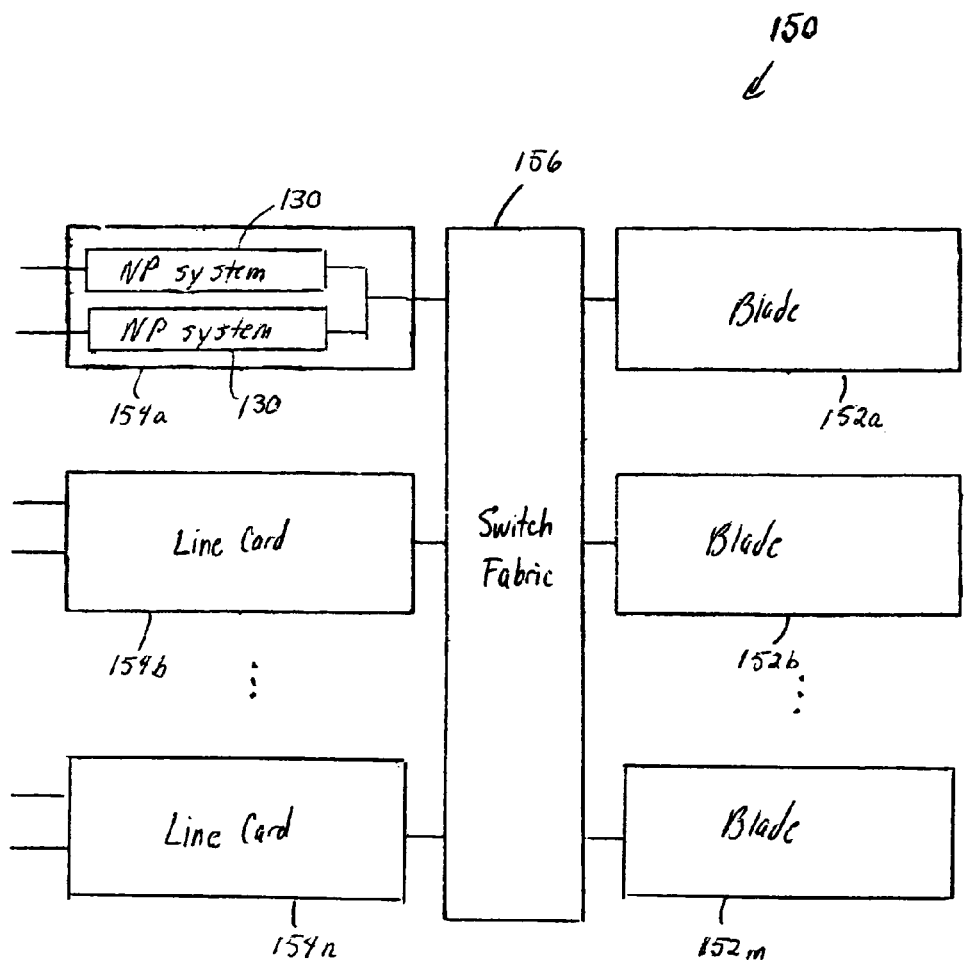
FIG. 6 is a block diagram of an exemplary networking application in which a system such as that shown in FIG. 5 is employed.

Techniques described above may be used in a variety of implementations. For example, as shown in FIG. 6, a distributed processing platform 150 includes a collection of blades 152a-152m and line cards 154a-154n interconnected by a backplane 156, e.g., a switch fabric (as shown). The switch fabric 156, for example, may conform to Common Switch Interface (CSIX) or other fabric technologies such as HyperTransport, Infiniband, Peripheral Component Interconnect (PCI), Packet-Over-SONET, RapidIO, and/or Universal Test and Operations PHY Interface for ATM (UTOPIA).

The line card is where line termination and I/O processing occurs. It may include processing in the data plane (packet processing) as well as control plane processing to handle the management of policies for execution in the data plane. The blades 152a-152m may include: control blades to handle control plane operations not distributed to line cards; control blades to perform system management operations such as driver enumeration, route table management, global table management, network address translation and messaging to a control blade; applications and service blades; and content processing. In a network infrastructure, content processing may be used to handle intensive content-based processing outside the capabilities of the standard line card applications including voice processing, encryption offload and intrusion-detection where performance demands are high.

In networking applications, for example, it is possible to bring packet processing and general purpose processing closer together for optimal, high-throughput communication between packet processing elements of a network processor and the control and/or content processing of general purpose processors. Thus, at least one of the line cards, e.g., line card 154a, may be a specialized line card that is implemented based on the architecture of system 130, to more tightly couple the processing intelligence of a general purpose processor to the more specialized capabilities of a network processor. The line card 154a includes a first NP system 130 to handle communications between network connections and the switch fabric 156 for inbound traffic as an ingress processor and a second NP system 130 to handle communications between switch fabric 156 and network connections for outbound traffic as an egress processor, although a single NP system could be used to handle processing in both directions. Depending on the configuration of blades and line cards, the distributed processing platform 150 could implement a switching device (e.g., switch or router), a server, a datacenter or other type of equipment.

Although the logic 54 has been illustrated in the context of a network processing environment, the mechanism may have other applications as well. It could be used by any processor that accesses data with arbitrary alignment and moves data units of arbitrary size, such as a processor that performs remote direct memory access (RDMA), as one example.

The logic may be implemented via dedicated circuitry (e.g., an Application Specific Integrated Circuit) and/or programmable circuitry (e.g., a programmable core), for example, that operates on instructions disposed on an article of manufacture (e.g., a non-volatile storage medium).

Other embodiments are within the scope of the following claims.

What is claimed is:

1. A method comprising:
    generating multiple cache line accesses to multiple respective cache lines of a cache as required to satisfy an access to data specified by a single instruction of a processing element specifying the access to data,
    said generating comprising:
        obtaining an address and length for access specified by the single instruction;
        determining a number of cache lines of the cache affected by the single instruction based on the address and length; and
        generating the cache line accesses for the determined number of cache lines.

2. The method of claim 1 wherein the address comprises a byte-aligned address.

3. The method of claim 1 wherein the length comprises a byte length.

4. The method of claim 1 wherein the processing element comprises one of a set of multiple processing elements of a network processor.

5. The method of claim 1 wherein the processing element comprises one of a set of multiple programmable processor cores integrated within the same silicon die.

6. The method of claim 1 wherein the single instruction is directed to a memory shared by at least two processors, at least two of the processors having different processor architectures.

7. The method of claim 1 wherein the determining the number of cache lines comprises:
    determining a start address for a first cache line to be accessed;
    determining an end address for a last cache line to be accessed; and
    computing the number of cache lines based on the difference between the end address and the start address divided by the line size.

8. The method of claim 7 wherein the determining the start address comprises:
    subtracting one from the line size to produce a first value;
    performing a NOT operation on the first value to produce a second value; and
    performing an AND operation on the address and the second value.

9. The method of claim 8 wherein the determining the end address comprises:
    adding the offset and the length to produce a third value; and
    performing an AND operation on the third value and the second value.

10. The method of claim 8 wherein the line size is a power of two bytes.

11. The method of claim 7 wherein the generating the cache line accesses comprises:
   initiating a cache line access at an address equal to the start address;
   incrementing the address by the line size for each consecutive additional cache line access and initiating a cache line access at such address, until cache line accesses have been initiated for the determined number of cache lines.

12. The method of claim 1 further comprising buffering data received in response to the multiple cache accesses.

13. The method of claim 1 wherein generating comprises:
   obtaining a length and an address with high order bits specifying a cache line address;
   generating a cache line access to a cache line addressed by the cache line address;
   incrementing the cache line address by the line size;
   generating a cache line access to a cache line addressed by the incremented cache line address;
   and decrementing corresponding high order bits of the length if the corresponding high order bits of the length are not zero.

14. The method of claim 1, further comprising sending an access request to a memory in response to a cache miss of a one of the multiple cache accesses.

15. A processor, comprising:
   at least one processing element; and
   a control unit to:
      generate multiple cache line accesses to multiple respective cache lines of a cache as required to satisfy an access to data specified by a single instruction of a processing element specifying an access to data,
      obtain an address and length for the single instruction;
      determine a number of the cache lines affected by the single instruction based on the address and length; and
      generate the cache line accesses for the determined number of cache lines.

16. The processor of claim 15 wherein the address comprises a byte-aligned address.

17. The processor of claim 15 wherein the length comprises a byte length.

18. The processor of claim 15 further comprising an external memory shared by the processing element of the processor and a second processor.

19. The processor of claim 18 wherein the processor and the second processor have different processor architectures.

20. The processor of claim 15 wherein the control unit comprises a control unit to:
   determine a start address for a first cache line to be accessed;
   determine an end address for a last cache line to be accessed; and
   compute the number of cache lines by based on the difference between the end address and the start address divided by a line size.

21. The processor of claim 20 wherein control unit comprises a control unit to:
   subtract one from the line size to produce a first value;
   perform a NOT operation on the first value to produce a second value; and
   perform an AND operation on the address and the second value.

22. The processor of claim 21 wherein the control unit comprises a control unit to:
   add the offset and the length to produce a third value; and
   perform an AND operation on the third value and the second value.

23. The processor of claim 20 wherein the control unit comprises a control unit to:
   initiate a cache line access at an address equal to the start address; and
   increment the address by the line size for each consecutive additional cache line access and initiating a cache line access at such address, until cache line accesses have been initiated for the determined number of cache lines.

24. The processor of claim 15 wherein a memory transaction completes after the cache line accesses have completed.

25. The processor of claim 15 wherein the control unit comprises a control unit to:
   obtain a length and an address with high order bits specifying a cache line address for the memory transaction, which is directed to a cache-based memory organized into cache lines of a given line size;
   generate a cache line access to a cache line addressed by the cache line address; and
   increment the cache line address by the line size, generating a cache line access to a cache line addressed by the incremented cache line address and decrementing corresponding high order bits of the length if the corresponding high order bits of the length are not zero.

26. A system comprising:
   a first processor;
   a second processor;
   a memory system including a memory shared by the first processor and the second processor, and to which the first processor and the second processor are coupled by a memory bus; and
   wherein the first processor comprises:
      a cache having cache lines, of a given line size, in which data of the memory is read and written;
      at least one processing element; and
      logic to:
         generate multiple cache line accesses to multiple respective cache lines of a cache as required to satisfy an access to data specified by a single instruction of a processing element specifying an access to data;
         obtain an address and length for the single instruction;
         determine a number of the cache lines affected by the single instruction, based on the address and length by determining a start address for a first cache line to be accessed, determining an end address for a last cache line to be accessed and computing the number of cache lines by adding a value of one to the difference between the end address and the start address divided by the line size; and
         generate cache line accesses for the determined number of cache lines.

27. The system of claim 26 wherein, when the logic to determine the start address comprises logic to:
   subtract one from the line size to produce a first value;
   perform a NOT operation on the first value to produce a second value; and
   perform an AND operation on the address and the second value.

28. The system of claim 27 wherein the logic to determine the end address, comprises logic to:
   add the offset and the length to produce a third value; and
   perform an AND operation on the third value and the second value.

29. The system of claim 26 wherein, when the logic to generate the cache line accesses, comprises logic to:
- initiate a cache line access at an address equal to the start address; and
- increment the address by the line size for each consecutive additional cache line access and initiate a cache line access at such address, until cache line accesses have been initiated for the determined number of cache lines.

30. The system of claim 26 wherein the first processor and the second processor having different processor architectures.

31. A system comprising:
- a switch fabric; and
- line interface cards interconnected by the switch fabric, at least one of the line cards comprising:
  - a media interface to receive and transmit network traffic;
  - a memory bus;
  - a memory, coupled to the memory bus by a memory controller;
  - a first processor, connected to the media interface and the memory bus;
  - a second processor, connected to the memory bus; and wherein the first processor comprises:
    - a cache having cache lines, of a given line size, in which data of the memory is read and written;
    - multiple processing elements; and
    - a control unit to:
      - generate multiple cache line accesses to multiple respective cache lines of a cache as required to satisfy an access to data specified by a single instruction of a processing element specifying an access to data, said control unit, when generating the cache accesses, being configured to obtain an address and length for the single instruction, determine a number of the cache lines affected by the memory transaction, based on the address and length, and generate cache line accesses for the determined number of cache lines, said control unit, when determining the number of cache lines, being further configured to determine a start address for a first cache line to be accessed, determine an end address for a last cache line to be accessed, and to compute the number of cache lines by adding a value of one to the difference between the end address and the start address divided by the line size.

32. The system of claim 31 wherein the address comprises a byte-aligned address.

33. The system of claim 31 wherein length comprises a length of byte-granularity.

34. The system of claim 31 wherein, when generating the cache line accesses, the control unit operates to:
- initiate a cache line access at an address equal to the start address; and
- increment the address by the line size for each consecutive additional cache line access and initiating a cache line access at such address, until cache line accesses have been initiated for the determined number of cache lines.

* * * * *